US006649704B2

(12) United States Patent
Brewer et al.

(10) Patent No.: US 6,649,704 B2
(45) Date of Patent: *Nov. 18, 2003

(54) THERMOPLASTIC SILICONE ELASTOMERS FROM COMPATIBILIZED POLYAMIDE RESINS

(75) Inventors: Christopher Michael Brewer, Farwell, MI (US); Igor Chorvath, Midland, MI (US); Frances Marie Fournier, Flint, MI (US); Michael Kang-Jen Lee, Midland, MI (US); Dawei Li, Midland, MI (US); Robert Leo Oldinski, Bay City, MI (US); Lenin James Petroff, Bay City, MI (US); Richard Leroy Rabe, Midland, MI (US); David Joseph Romenesko, Midland, MI (US); Yongjun Lee, Kanagawa (JP); Koji Nakanishi, Chiba (JP)

(73) Assignee: Dow Corning Corporation, Midland, MI (US)

( * ) Notice: Subject to any disclaimer, the term of this patent is extended or adjusted under 35 U.S.C. 154(b) by 12 days.

This patent is subject to a terminal disclaimer.

(21) Appl. No.: 10/014,957

(22) Filed: Oct. 26, 2001

(65) Prior Publication Data

US 2002/0091205 A1 Jul. 11, 2002

Related U.S. Application Data

(63) Continuation-in-part of application No. 09/616,625, filed on Jul. 26, 2000, now Pat. No. 6,362,288.

(51) Int. Cl.$^7$ ................................. C08G 77/08
(52) U.S. Cl. .................... 525/431; 525/903; 524/730; 524/731; 524/862
(58) Field of Search ................. 525/431, 903; 524/862, 731, 730

(56) References Cited

U.S. PATENT DOCUMENTS

| | | | |
|---|---|---|---|
| 4,500,688 A | 2/1985 | Arkles | 525/431 |
| 4,695,602 A | 9/1987 | Crosby et al. | 524/439 |
| 4,714,739 A | 12/1987 | Arkles | 525/92 |
| 4,803,244 A | 2/1989 | Umpleby | 525/105 |
| 4,831,071 A | 5/1989 | Ward et al. | 524/401 |
| 4,849,469 A | 7/1989 | Crosby et al. | 524/439 |
| 4,891,407 A | 1/1990 | Mitchell | 525/104 |
| 4,970,263 A | 11/1990 | Arkles et al. | 525/92 |
| 5,391,594 A | 2/1995 | Romenesko et al. | 523/212 |
| 5,648,426 A | 7/1997 | Zolotnitsky | 525/100 |
| 5,872,187 A | 2/1999 | Takatani et al. | 525/133 |
| 5,919,864 A | 7/1999 | Watanabe et al. | 525/166 |
| 5,977,240 A | 11/1999 | Marie Lohmeijer et al. | 524/495 |
| 5,990,244 A | 11/1999 | Warakomski et al. | 525/179 |
| 6,013,715 A | 1/2000 | Gornowicz et al. | 524/492 |
| 6,281,286 B1 * | 8/2001 | Chormath et al. | 524/862 |
| 6,362,287 B1 * | 3/2002 | Chorvath et al. | 525/431 |
| 6,362,288 B1 * | 3/2002 | Brewer et al. | 525/431 |

FOREIGN PATENT DOCUMENTS

| | | |
|---|---|---|
| EP | 0 651 009 A1 | 5/1995 |
| JP | 62-11897 | 1/1987 |
| JP | 07-26147 | 1/1995 |
| WO | WO 96/01291 | 1/1996 |

\* cited by examiner

*Primary Examiner*—Margaret G. Moore
(74) *Attorney, Agent, or Firm*—Alan Zombeck

(57) ABSTRACT

A method for preparing a thermoplastic elastomer is disclosed, said method comprising
(I) mixing
(A) a rheologically stable polyamide resin having a melting point or glass transition temperature of 25° C. to 275° C.,
(B) a silicone base comprising
(B') 100 parts by weight of a diorganopolysiloxane gum having a plasticity of at least 30 and having an average of at least 2 alkenyl groups in its molecule and
(B") 5 to 200 parts by weight of a reinforcing filler, the weight ratio of said silicone base to said polyamide resin is from 35:65 to 85:15,
(C) a compatibilizer selected from (i) a coupling agent, (ii) a functional diorganopolysiloxane or (iii) a copolymer comprising at least one diorganopolysiloxane block and at least one block selected from polyamide, polyether, polyurethane, polyurea, polycarbonate or polyacrylate,
(D) an organohydrido silicon compound which contains an average of at least 2 silicon-bonded hydrogen groups in its molecule and
(E) a hydrosilation catalyst, components (D) and (E) being present in an amount sufficient to cure said diorganopolysiloxane (B'); and
(II) dynamically curing said diorganopolysiloxane (B').

25 Claims, No Drawings

THERMOPLASTIC SILICONE ELASTOMERS FROM COMPATIBILIZED POLYAMIDE RESINS

This application is a continuation in part of U.S. patent application Ser. No. 09/616,625, filed Jul. 26, 2000, now U.S. Pat. No. 6,362,288.

FIELD OF THE INVENTION

The present invention relates to a thermoplastic elastomer composition wherein a silicone base is blended with a polyamide resin and a compatibilizer and silicone gum contained in the base is dynamically vulcanized during the mixing process.

BACKGROUND OF THE INVENTION

Thermoplastic elastomers (TPEs) are polymeric materials which possess both plastic and rubbery properties. They have elastomeric mechanical properties but, unlike conventional thermoset rubbers, they can be re-processed at elevated temperatures. This re-processability is a major advantage of TPEs over chemically crosslinked rubbers since it allows recycling of fabricated parts and results in a considerable reduction of scrap.

In general, two main types of thermoplastic elastomers are known. Block copolymer thermoplastic elastomers contain "hard" plastic segments which have a melting point or glass transition temperature above ambient as well as "soft" polymeric segments which have a glass transition or melt point considerably below room temperature. In these systems, the hard segments aggregate to form distinct microphases and act as physical crosslinks for the soft phase, thereby imparting a rubbery character at room temperature. At elevated temperatures, the hard segments melt or soften and allow the copolymer to flow and to be processed like an ordinary thermoplastic resin.

Alternatively, a thermoplastic elastomer referred to as a simple blend (physical blend) can be obtained by uniformly mixing an elastomeric component with a thermoplastic resin. When the elastomeric component is also cross-linked during mixing, a thermoplastic elastomer known in the art as a thermoplastic vulcanizate (TPV) results. Since the crosslinked elastomeric phase of a TPV is insoluble and non-flowable at elevated temperature, TPVs generally exhibit improved oil and solvent resistance as well as reduced compression set relative to the simple blends.

Typically, a TPV is formed by a process known as dynamic vulcanization, wherein the elastomer and the thermoplastic matrix are mixed and the elastomer is cured with the aid of a crosslinking agent and/or catalyst during the mixing process. A number of such TPVs are known in the art, including some wherein the crosslinked elastomeric component can be a silicone polymer while the thermoplastic component is an organic, non-silicone polymer (i.e., a thermoplastic silicone vulcanizate or TPSiV). In such a material, the elastomeric component can be cured by various mechanisms, but it has been shown that the use of a non-specific radical initiator, such as an organic peroxide, can also result in at least a partial cure of the thermoplastic resin itself, thereby reducing or completely destroying the ability to re-process the composition (i.e., it no longer is a thermoplastic). In other cases, the peroxide can lead to the partial degradation of the thermoplastic resin. To address these problems, elastomer-specific crosslinkers, such as organohydrido silicon compounds, can be used to cure alkenyl-functional silicone elastomers.

Arkles, in U.S. Pat. No. 4,500,688, discloses semi-interpenetrating networks (IPN) wherein a vinyl-containing silicone fluid having a viscosity of 500 to 100,000 cS is dispersed in a conventional thermoplastic resin. Arkles only illustrates these IPNs at relatively low levels of silicone. The vinyl-containing silicone is vulcanized in the thermoplastic during melt mixing according to a chain extension or crosslinking mechanism which employs a silicon hydride-containing silicone component. This disclosure states that the chain extension procedure results in a thermoplastic composition when the vinyl-containing silicone has 2 to 4 vinyl groups and the hydride-containing silicone has 1 to 2 times the equivalent of the vinyl functionality. On the other hand, silicones which predominantly undergo crosslinking reaction result in thermoset compositions when the vinyl-containing silicone has 2 to 30 vinyl groups and the hydride-containing silicone has 2 to 10 times the equivalent of the vinyl functionality. Typical thermoplastics mentioned include polyamides, polyurethanes, styrenics, polyacetals and polycarbonates. This disclosure is expanded by Arkles in U.S. Pat. No. 4,714,739 to include the use of hybrid silicones which contain unsaturated groups and are prepared by reacting a hydride-containing silicone with an organic polymer having unsaturated functionality. Although Arkles discloses a silicone fluid content ranging from 1 to 40 weight percent (1 to 60% in the case of the '739 patent), there is no suggestion of any criticality as to these proportions or to the specific nature of the organic resin.

Publication WO 96/01291 to Advanced Elastomer Systems discloses thermoplastic elastomers having improved resistance to oil and compression set. These systems are prepared by first forming a cured rubber concentrate wherein a curable elastomeric copolymer is dispersed in a polymeric carrier not miscible therewith, the curable copolymer being dynamically vulcanized while this combination is mixed. The resulting rubber concentrate is, in turn, blended with an engineering thermoplastic to provide the desired TPE. Silicone rubber is disclosed as a possible elastomeric component, but no examples utilizing such a silicone are provided. Further, this publication specifically teaches that the polymeric carrier must not react with the cure agent for the curable copolymer.

Crosby et al. in U.S. Pat. No. 4,695,602 teach composites wherein a silicone semi-IPN vulcanized via a hydrosilation reaction is dispersed in a fiber-reinforced thermoplastic resin having a high flexural modulus. The silicones employed are of the type taught by Arkles, cited supra, and the composites are said to exhibit improved shrinkage and warpage characteristics relative to systems which omit the IPN.

Ward et al., in U.S. Pat. No. 4,831,071, disclose a method for improving the melt integrity and strength of a high modulus thermoplastic resin to provide smooth-surfaced, high tolerance profiles when the modified resin is melt-drawn. As in the case of the disclosures to Arkles et al., cited supra, a silicone mixture is cured via a hydrosilation reaction after being dispersed in the resin to form a semi-IPN, and the resulting composition is subsequently extruded and melt-drawn.

European Patent Application 0651009A1 to Sumitomo Bakelite Co., published May 3, 1995, discloses a thermoplastic elastomer composition which is prepared by dynamically heating a mixture comprising an unsaturated organic (i.e., non-silicone) rubber, a thermoplastic resin, an SiH-containing crosslinker, a hydrosilating catalyst and a compatibilizing agent.

U.S. Pat. No. 6,013,715 to Gornowicz et al. teaches the preparation of TPSiV elastomers wherein a silicone gum (or filled silicone gum) is dispersed in either a polyolefin or a poly(butylene terephthalate) resins and the gum is subsequently dynamically vulcanized therein via a hydrosilation cure system. The resulting elastomers exhibit an ultimate elongation at break of at least 25% and have significantly improved mechanical properties over the corresponding simple blends of resin and silicone gum in which the gum is not cured (i.e., physical blends). This is, of course, of great commercial significance since the vulcanization procedure, and the cure agents required therefor, add to both the complexity as well as the expense of the preparation and vulcanization would be avoided in many applications if essentially identical mechanical properties could be obtained without its employ.

Copending application Ser. No. 09/393029, filed on Sep. 9, 1999, discloses that the impact resistance of polyester and polyamide resins can be greatly augmented by preparing a thermoplastic silicone vulcanizate therefrom wherein the elastomeric component is a silicone rubber base which comprises a silicone gum and a silica filler and the weight ratio of the base to the resin ranges from 10:90 to 35:65. Although the resulting thermoplastic materials have improved impact resistance, they do not exhibit sufficiently low modulus to be useful as elastomers.

Copending application Ser. No. 09/535,556, filed on Mar. 27, 2000, discloses the incorporation of a hindered phenol compound in a TPSiV based on specific nylons wherein the phenol compound imparts improved mechanical properties relative to an unmodified composition.

SUMMARY OF THE INVENTION

It has now been discovered that TPSiV elastomers of the type described in above cited U.S. Pat. No. 6,013,715 can be prepared from certain polyamide resins wherein the silicone component is a base comprising a diorganopolysiloxane gum and a reinforcing filler. As in the case of the teachings of U.S. Pat. No. 6,013,715, the elastomers disclosed herein generally also have good appearance, have an elongation of at least 25% and have a tensile strength and/or elongation at least 25% greater than that of the corresponding simple (physical) blend wherein the diorganopolysiloxane is not cured. However, it has been surprisingly found that inclusion of a minor portion of a compatibilizer in the formulation improves either tensile strength or elongation over a similar TPSiV which does not contain the compatibilizer. Alternatively, inclusion of the compatibilizer results in a reduced melt viscosity of the thermoplastic elastomer vulcanizates (as reflected by process torque measurements during mixing) without an associated degradation of tensile strength or elongation. This reduction is of considerable value to fabricators since the elastomers of the present invention can be more readily processed in conventional equipment (e.g., extruders, injection molders) and results in lower energy consumption. Furthermore, unlike the teachings of Arkles, cited supra, and others, the silicone component which is dispersed in the thermoplastic resin, and dynamically cured therein, must include a high molecular weight gum, rather than a low viscosity silicone fluid, the latter resulting in compositions having poor uniformity.

The present invention, therefore, relates to a thermoplastic elastomer prepared by (I) mixing
  (A) a Theologically stable polyamide resin having a melting point or glass transition temperature of 25° C. to 275°C.,
  (B) a silicone base comprising
    (B') 100 parts by weight of a diorganopolysiloxane gum having a plasticity of at least 30 and having an average of at least 2 alkenyl groups in its molecule and
    (B") 5 to 200 parts by weight of a reinforcing filler, the weight ratio of said silicone base to said polyamide resin is from 35:65 to 85:15,
  (C) for each 100 parts by weight of said polyamide resin, a compatibilizer selected from
    (i) 0.1 to 5 parts by weight of a coupling agent having a molecular weight of less than 800 which contains at least two groups independently selected from ethylenically unsaturated group, epoxy, anhydride, silanol, carboxyl, oxazoline or alkoxy having 1 to 20 carbon atoms, in its molecule,
    (ii) 0.1 to 10 parts by weight of a functional diorganopolysiloxane having at least one group selected from epoxy, anhydride, silanol, carboxyl, amine, oxazoline or alkoxy having 1 to 20 carbon atoms, in its molecule, or
    (iii) from 0.1 to 10 parts by weight of a copolymer comprising at least one diorganopolysiloxane block and at least one block selected from polyamide, polyether, polyurethane, polyurea, polycarbonate or polyacrylate,
  (D) an organohydrido silicon compound which contains an average of at least 2 silicon-bonded hydrogen groups in its molecule and
  (E) a hydrosilation catalyst,
components (D) and (E) being present in an amount sufficient to cure said diorganopolysiloxane (B'),
  (F) a stabilizer selected from hindered phenols, thioesters, hindered amines, 2,2'-(1,4-phenylene)bis (4H-3, 1-benzoxazin-4-one), and 3,5-di-tert-butyl-4-hydroxybenzoic acid, hexadecyl ester; and
(II) dynamically curing said diorganopolysiloxane (B').

The invention further relates to a thermoplastic elastomer which is prepared by the above method.

DETAILED DESCRIPTION OF THE INVENTION

Component (A) of the present invention is a thermoplastic polyamide resin. These resins are well known by the generic term "nylon" and are long chain synthetic polymers containing amide (i.e., —C(O)—NH—) linkages along the main polymer chain. For the purposes of the present invention, the polyamide resin has a melt point (m.p.), or glass transition temperature ($T_g$) if the polyamide is amorphous, of room temperature (i.e., 25° C.) to 275° C. Attempts to prepare TPSiV elastomers from polyamides having higher melt points (e.g., nylon 4/6) resulted in poor physical properties, the ultimate elongation of such products being less than the required 25% according to the present invention. Furthermore, for the purposes of the present invention, the polyamide resin is preferably dried by passing a dry, inert gas over resin pellets or powder at elevated temperatures. The degree of drying consistent with acceptable properties and processing depends on the particular polyamide and its value is generally recommended by the manufacturer or may be determined by a few simple experiments. It is generally preferred that the polyamide resin contains no more than about 0.1 weight percent of moisture. Finally, the polyamide must also be theologically stable under the mixing conditions required to prepare the TPSiV elastomer, as described infra. This stability is evaluated on the neat resin at the appropriate processing temperature and a change of more than 20% in melt viscosity (mixing torque) within the time generally required to prepare the corresponding TPSiVs (e.g., 10 to 30 minutes in a bowl mixer) indicates that the resin is outside the scope of the present invention. Thus, for example, a dried nylon 11 sample having a m.p. of 198° C. was mixed in a bowl mixer under a nitrogen gas purge at about 210 to 220° C. for about 15 minutes and the observed mixing torque increased by approximately 200%. Such a polyamide resin is not a suitable candidate for the instant method.

Other than the above mentioned limitations, resin (A) can be any thermoplastic crystalline or amorphous high molecular weight solid homopolymer, copolymer or terpolymer having recurring amide units within the polymer chain. In copolymer and terpolymer systems, more than 50 mole percent of the repeat units are amide-containing units. Examples of suitable polyamides are polylactams such as nylon 6, polyenantholactam (nylon 7), polycapryllactam (nylon 8), polylauryllactam (nylon 12), and the like; homopolymers of aminoacids such as polypyrrolidinone (nylon 4); copolyamides of dicarboxylic acid and diamine such as nylon 6/6, nylon 66, polyhexamethyleneazelamide (nylon 6/9), polyhexamethylene-sebacamide (nylon 6/10), polyhexamethyleneisophthalamide (nylon 6,I), polyhexamethylenedodecanoic acid (nylon 6/12) and the like; aromatic and partially aromatic polyamides; copolyamides such as copolymers of caprolactam and hexamethyleneadipamide (nylon 6,6/6), or a terpolyamide (e.g., nylon 6,6/6,6); block copolymers such as polyether polyamides; or mixtures thereof. Preferred polyamide resins are nylon 6, nylon 12, nylon 6/12 and nylon 6/6.

It is also contemplated that component (A) can be blended with a non-polyamide, saturated thermoplastic resin such that the polyamide resin (A) comprises more than 50 percent of the blend volume. Preferably, this optional resin should have a glass transition temperature of 25° C. to 275° C.

Silicone base (B) is a uniform blend of a diorganopolysiloxane gum (B') and a reinforcing filler (B").

Diorganopolysiloxane (B') is a high consistency (gum) polymer or copolymer which contains at least 2 alkenyl groups having 2 to 20 carbon atoms in its molecule. The alkenyl group is specifically exemplified by vinyl, allyl, butenyl, pentenyl, hexenyl and decenyl. The position of the alkenyl functionality is not critical and it may be bonded at the molecular chain terminals, in non-terminal positions on the molecular chain or at both positions. It is preferred that the alkenyl group is vinyl or hexenyl and that this group is present at a level of 0.001 to 3 weight percent, preferably 0.01 to 1 weight percent, in the diorganopolysiloxane gum.

The remaining (i.e., non-alkenyl) silicon-bonded organic groups in component (B') are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl. It will be understood, of course, that these groups are selected such that the diorganopolysiloxane gum (B') has a glass temperature (or melt point) which is below room temperature and the gum is therefore elastomeric. Methyl preferably makes up at least 50, more preferably at least 90, mole percent of the non-unsaturated silicon-bonded organic groups in component (B').

Thus, polydiorganosiloxane (B') can be a homopolymer or a copolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain, linear structures being preferred.

Specific illustrations of organopolysiloxane (B') include: trimethylsiloxy-endblocked dimethylsiloxane-methylhexenylsiloxane copolymers; dimethyl-hexenlylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethyl-vinylsiloxy-endblocked methylphenylsiloxane-dimethylsiloxane-methylvinylsiloxane copolymers; and similar copolymers wherein at least one end group is dimethylhydroxysiloxy. Preferred systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 93%.

Component (B') may also consist of combinations of two or more organopolysiloxanes. Most preferably, component (B') is a polydimethylsiloxane homopolymer which is terminated with a vinyl group at each end of its molecule or is such a homopolymer which also contains at least one vinyl group along its main chain.

For the purposes of the present invention, the molecular weight of the diorganopolysiloxane gum is sufficient to impart a Williams plasticity number of at least about 30 as determined by the American Society for Testing and Materials (ASTM) test method 926. The plasticity number, as used herein, is defined as the thickness in millimeters×100 of a cylindrical test specimen 2 cm$^3$ in volume and approximately 10 nm in height after the specimen has been subjected to a compressive load of 49 Newtons for three minutes at 25° C. When the plasticity of this component is less than about 30, as in the case of the low viscosity fluid siloxanes employed by Arkles, cited supra, the TPSiVs prepared by dynamic vulcanization according to the instant method exhibit poor uniformity such that at high silicone contents (e.g., 50 to 70 weight percent) there are regions of essentially only silicone and those of essentially only thermoplastic resin, and the blends are weak and friable. The gums of the present invention are considerably more viscous than the silicone fluids employed in the prior art. For example, silicones contemplated by Arkles, cited supra, have an upper viscosity limit of 100,000 cS (0.1 m$^2$/s) and, although the plasticity of fluids of such low viscosity are not readily measured by the ASTM D 926 procedure, it was determined that this corresponds to a plasticity of approximately 24. Although there is no absolute upper limit on the plasticity of component (B'), practical considerations of processability in conventional mixing equipment generally restrict this value. Preferably, the plasticity number should be about 100 to 200, most preferably about 120 to 185.

Methods for preparing high consistency unsaturated group-containing polydiorganosiloxanes are well known and they do not require a detailed discussion in this specification. For example, a typical method for preparing an alkenyl-functional polymer comprises the base-catalyzed equilibration of cyclic and/or linear diorganopolysiloxanes in the presence of similar alkenyl-functional species.

Component (B") is a finely divided filler which is known to reinforce diorganopolysiloxane (B') and is preferably selected from finely divided, heat stable minerals such as fumed and precipitated forms of silica, silica aerogels and titanium dioxide having a specific surface area of at least about 50 m$^2$/gram. The fumed form of silica is a preferred reinforcing filler based on its high surface area, which can be up to 450 m$^2$/gram and a fumed silica having a surface area of 50 to 400 m$^2$/g, most preferably 200 to 380 m$^2$/g, is highly preferred. Preferably, the fumed silica filler is treated to render its surface hydrophobic, as typically practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creeping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. It is preferred that the treating compound is an oligomeric hydroxy-terminated diorganopolysiloxane having an average degree of polymerization (DP) of 2 to about 100, more preferably about 2 to about 10 and it is used at a level of about 5 to 50 parts by weight for each 100 parts by weight of the silica filler. When component (B') is the preferred vinyl-functional or hexenyl-functional polydimethylsiloxane, this treating agent is preferably a hydroxy-terminated polydimethylsiloxane.

For the purposes of the present invention, 5 to 200 parts by weight, preferably 5 to 150 and most preferably 20 to 100 parts by weight, of the reinforcing filler (B") are uniformly blended with 100 parts by weight of gum (B') to prepare silicone base (B). This blending is typically carried out at room temperature using a two-roll mill, internal mixer or other suitable device, as well known in the silicone rubber art. Alternatively, the silicone base can be formed in-situ during mixing prior to dynamic vulcanization of the gum, as further described infra. In the latter case, the temperature of mixing is kept below the softening point or melting point of the polyamide resin until the reinforcing filler is well dispersed in the diorganopolysiloxane gum.

The compatibilizer (C) may be a coupling agent, an organofunctional diorganopolysiloxane or a siloxane copolymer. For the purposes of the present invention, at least one compatibilizer is included in the preparation of the thermoplastic elastomer.

In one embodiment, the compatibilizer is (i) a coupling agent having a molecular weight of less than 800 which contains at least two groups in its molecule which are independently selected from ethylenically unsaturated groups (e.g., vinyl, allyl, butenyl, pentenyl, hexenyl, acrylate and methacrylate), epoxy, anhydride, silanol, hydroxyl, alkoxy having 1 to 20, preferably from 1 to 10, more preferably from 1 to 4, carbon atoms, carboxyl or oxazoline. The latter group has the structure

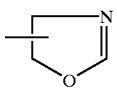

wherein the carbon atoms of the ring may contain one or more substituents selected from hydrocarbon groups having 1 to 4 carbon atoms. The coupling agent can have an organic or siloxane-based skeletal structure as long as it contains at least two of the above mentioned groups, these being located at terminal positions, along the backbone or both. In the case of siloxane backbones, the above mentioned functional organic groups (i.e., non-silanol) are attached to silicon atoms via Si—C bonds (e.g., through a divalent hydrocarbon group such as trimethylene, tetramethylene and dimethylene) or a divalent organic group containing oxygen and/or nitrogen heteroatoms, such as ester, ether or amide. Although the groups may be the same, it is generally preferred that at least one of these is an ethylenically unsaturated group, preferably vinyl, while at least one other group is selected from the above mentioned epoxy, anhydride, alkoxy, silanol, hydroxyl, carboxyl or oxazoline groups.

Examples of suitable coupling agents include allyl glycidyl ether, glycidyl methacrylate, 1,2-epoxy-7-octene, 1,2-epoxy-9-decene, 1,2-epoxy-5-hexene, allyl succinic anhydride, vinyloxazolines, vinyloxazoline derivatives such as 2-isopropenyl-2-oxazoline, gamma-glycidoxypropylmethyldimethoxysilane, gamma-glycidoxypyltrimethoxysilane, beta-(3,4-epoxycyclohexyl) ethyltrimethoxysilane, 1,3-phenylene-bis (2-oxazoline), poly(propylene glycol) diglycidyl ether, diglycidyl ether of bisphenol A, tris(2,3-epoxypropy) isocyanurate and unsaturated diamides such as $CH_2$=CH—$(CH_2)_8$—CO—NH—$(CH_2)_6$—NH—CO—$(CH_2)_8$—CH=$CH_2$, inter alia.

The concentration of these coupling agents can be from 0.1 to 5 parts by weight for each 100 parts by weight of the polyamide (A), preferably, from 0.2 to 3 parts by weight.

In another embodiment, the compatibilizer is (ii) a functional diorganopolysiloxane having a number average molecular weight of at least 800, preferably 800 to 50,000, more preferably from 800 to 15,000. The functional diorganopolysiloxane (ii) is a polymer or copolymer in which the organic groups are independently selected from hydrocarbon or halogenated hydrocarbon groups which contain no aliphatic unsaturation, as described above for component (B'), including preferred embodiments thereof. However, at least one functional group selected from epoxy, anhydride, silanol, alkoxy having 1 to 20, preferably from 1 to 10, more preferably from 1 to 4, carbon atoms, amine, carboxyl or oxazoline, as described above, must be present in this polymer or copolymer.

Examples of suitable component (ii) include epoxy-functional polydimethylsiloxanes, such as mono (2,3-epoxy) propylether-terminated polydimethylsiloxane, epoxypropoxypropyl-terminated polydimethylsiloxane, (epoxycyclohexylethyl)methylsiloxane-dimethylsiloxane copolymers, and (epoxypropoxypropyl)methylsiloxane-dimethylsiloxane copolymers; amine-functional polydimethylsiloxanes, such as aminopropyl-terminated polydimethylsiloxane, aminoethylaminopropyl-terminated polydimethylsiloxane, aminopropyl-grafted polydimethylsiloxane, aminoethylaminopropyl-grafted polydimethylsiloxane; polydimethylsiloxanes containing anhydride groups, such as succinic anhydride-terminated polydimethylsiloxane and succinic anhydride-grafted polydimethylsiloxane; silanol-terminated polydimethylsiloxanes; polydimethylsiloxanes containing carboxyl groups, such as (mono)carboxydecyl-terminated polydimethylsiloxane and carboxydecyl-terminated polydimethylsiloxane; and polydimethylsiloxanes containing oxazoline groups, such as vinylxoazoline grafted polydimethylsiloxane.

The concentration of the functional diorganopolysiloxane can be from 0.5 to 10 parts by weight for each 100 parts by weight of the polyamide (A), preferably, from 0.5 to 5 parts by weight.

In the case of compatibilizers (i) and (ii), it is sometimes preferred to mix the compatibilizer with the polyamide resin at a temperature above the melt point of the resin prior to addition of the silicone base. While not wishing to be held to any theory or mechanism, it is believed that this procedure results in a reaction between the functional groups of the compatibilizer and either the amide or end groups of the resin, thereby maximizing compatibilization efficiency. Alternatively, it is sometimes advantageous to add the compatibilizer to a mixture of the polyamide and the silicone base. In any event, the preferred technique can be readily determined by routine experimentation.

In yet another embodiment, the compatibilizer is (iii) a block or graft copolymer comprising at least one diorganopolysiloxane block and at least one block selected from polyamide, polyether, polyurethane, polyurea, polycarbonate or polyacrylate. For example, copolymer (iii) can have a structure such as AB, (AB)$_n$, ABA, BAB, A-g-B and B-g-A, wherein n is an integer having a value greater than 1, A represents a diorganopolysiloxane block and B represents one of the above mentioned organic blocks. The diorganopolysiloxane block is a polymer or copolymer in which all of the organic groups are independently selected from hydrocarbon or halogenated hydrocarbon groups which contain no aliphatic unsaturation, these groups being previously described in connection with component (B'). Thus, for example, this component can be selected from diorganopolysiloxane-polyether block or graft copolymers, diorganopolysiloxane-polyamide block or graft copolymers, diorganopolysiloxane-polyurethane block or graft copolymers, diorganopolysiloxane-polyurea block or graft copolymers, diorganopolysiloxane-polycarbonate block or graft copolymers, diorganopolysiloxane-polyacrylate block or graft copolymers or diorganopolysiloxane-polymethacrylate block or graft copolymers, wherein the diorganopolysiloxane is preferably a polydimethylsiloxane block. It is preferred that the number average molecular weight of copolymer (iii) is 1,500 to 50,000, more preferably 2,000 to 20,000.

Examples of copolymer (iii) include polyamide-polydimethylsiloxane copolymers, such as the siloxane-based polyamides prepared by reacting an SiH-functional dimethylsiloxane and a reaction product of an olefinic acid with a diamine (as described in U.S. Pat. No. 5,981,680 to Petroff et al.); copolymers prepared by reacting α,ω-bis (aminoalkyl)polydimethylsiloxane and hydroxy-terminated polyamide prepolymers having a molecular weight of 1,500 to 3,000; copolymers prepared by reacting α,ω-bis (aminoalkyl)-functional polydimethylsiloxane and aromatic, aliphatic or cycloaliphatic diisocyanates having an average molecular weight of, e.g., 1,500 to 3,000; and copolymers of poly(alkylene oxide) and polydimethylsiloxane, such as poly(ethylene oxide)-polydimethylsiloxane-poly(ethylene oxide) block copolymers and poly(propylene oxide)-polydimethylsiloxane-poly(propylene oxide) block copolymers, as well as graft copolymers of such systems.

The concentration of these copolymers can be from 0.5 to 10 parts by weight for each 100 parts by weight of polyamide (A), preferably from 0.5 to 5 parts by weight.

The organohydrido silicon compound (D) is a crosslinker (cure agent) for diorganopolysiloxane (B') of the present composition and is an organopolysiloxane which contains at least 2 silicon-bonded hydrogen atoms in each molecule, but having at least about 0.1 weight percent hydrogen, preferably 0.2 to 2 and most preferably 0.5 to 1.7, percent hydrogen bonded to silicon. Those skilled in the art will, of course, appreciate that either component (B') or component (D), or both, must have a functionality greater than 2 if diorganopolysiloxane (B') is to be cured (i.e., the sum of these functionalities must be greater than 4 on average). The position of the silicon-bonded hydrogen in component (D) is not critical, and it may be bonded at the molecular chain terminals, in non-terminal positions along the molecular chain or at both positions. The silicon-bonded organic groups of component (D) are independently selected from any of the (non-alkenyl) hydrocarbon or halogenated hydrocarbon groups described above in connection with diorganopolysiloxane (B'), including preferred embodiments thereof. The molecular structure of component (D) is also not critical and is exemplified by straight-chain, partially branched straight-chain, branched, cyclic and network structures, linear polymers or copolymers being preferred, this component should be compatible with diorganopolysiloxane (B') (i.e., it is effective in curing component (B')).

Component (D) is exemplified by the following:
low molecular siloxanes, such as PhSi(OSiMe$_2$H)$_3$;
trimethylsiloxy-endblocked methylhydridopolysiloxanes;
trimethylsiloxy-endblocked dimethylsiloxane-methylhydridosiloxane copolymers;
dimethylhydridosiloxy-endblocked dimethylpolysiloxanes;
dimethylhydrogensiloxy-endblocked methylhydrogenpolysiloxanes;
dimethylhydridosiloxy-endblocked dimethylsiloxane-methylhydridosiloxane copolymers;
cyclic methylhydrogenpolysiloxanes;
cyclic dimethylsiloxane-methylhydridosiloxane copolymers;
tetrakis(dimethylhydrogensiloxy)silane;
silicone resins composed of (CH$_3$)$_2$HSiO$_{1/2}$, (CH$_3$)$_3$SiO$_{1/2}$, and SiO$_{4/2}$ units; and
silicone resins composed of (CH$_3$)$_2$HSiO$_{1/2}$, (CH$_3$)$_3$SiO$_{1/2}$, CH$_3$SiO$_{03/2}$, PhSiO$_{3/2}$ and SiO$_{4/2}$ units,
wherein Me and Ph hereinafter denote methyl and phenyl groups, respectively.

Particularly preferred organohydrido silicon compounds are polymers or copolymers comprising RHSiO units ended with either R$_3$SiO$_{1/2}$ or HR$_2$SiO$_{1/2}$, wherein R is independently selected from alkyl groups having 1 to 20 carbon atoms, phenyl or trifluoropropyl, preferably methyl. It is also preferred that the viscosity of component (D) is about 0.5 to 1,000 mPa-s at 25° C., preferably 2 to 500 mPa-s. Further, this component preferably has 0.5 to 1.7 weight percent hydrogen bonded to silicon. It is highly preferred that component (D) is selected from a polymer consisting essentially of methylhydridosiloxane units or a copolymer consisting essentially of dimethylsiloxane units and methylhydridosiloxane units, having 0.5 to 1.7 percent hydrogen bonded to silicon and having a viscosity of 2 to 500 mPa-s at 25° C. It is understood that such a highly preferred system will have terminal groups selected from trimethylsiloxy or dimethylhdridosiloxy groups.

Component (D) may also be a combination of two or more of the above described systems. The organohydrido silicon compound (D) is used at a level such that the molar ratio of SiH therein to Si-alkenyl in component (B') is greater than 1 and preferably below about 50, more preferably 3 to 30, most preferably 4 to 20.

These SiH-functional materials are well known in the art and many of them are commercially available.

Hydrosilation catalyst (E) is a catalyst that accelerates the cure of diorganopolysiloxane (B') in the present composition. This hydrosilation catalyst is exemplified by platinum catalysts, such as platinum black, platinum supported on silica, platinum supported on carbon, chloroplatinic acid, alcohol solutions of chloroplatinic acid, platinum/olefin complexes, platinum/alkenylsiloxane complexes, platinum/beta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (E) is preferably a platinum-based catalyst such as chloroplatinic acid; platinum dichloride; platinum tetrachloride; a platinum complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 to Willing; and a neutralized complex of platinous chloride and divinyltetramethyldisiloxane, prepared according to U.S. Pat. No. 5,175,325 to Brown et al. Most preferably, catalyst (E) is a neutralized complex of platinous chloride and divinyltetramethyldisiloxane.

Component (E) is added to the present composition in a catalytic quantity sufficient to promote the reaction of components (B') and (D) and thereby cure the diorganopolysiloxane to form an elastomer. The catalyst is preferably added so as to provide about 0.1 to 500 parts per million (ppm) of metal atoms based on the total weight of the thermoplastic elastomer composition, more preferably 0.25 to 100 ppm.

A stabilizer (F) is also included in the formulation of the present invention. Stabilizer (F) is at least one organic compound selected from hindered phenols; thioesters; hindered amines; 2,2'-(1,4-phenylene)bis(4H-3, 1-benzoxazin-4-one); or 3,5-di-tert-butyl-4-hydroxybenzoic acid, hexadecyl ester.

For the purposes of the present invention, a hindered phenol is an organic compound having at least one group of the formula

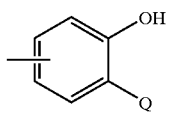

(i)

in its molecule, wherein Q is a monovalent organic group having 1 to 24 carbon atoms selected from hydrocarbon groups, hydrocarbon groups which optionally contain heteroatoms selected from sulfur, nitrogen or oxygen or halogen-substituted versions of the aforementioned groups. Examples of Q include groups such as alkyl, aryl, alkylaryl, arylalkyl, cycloalkyl and halogen-substituted version thereof; alkoxy groups having 1 to 24 carbon atoms, such as methoxy or t-butoxy; and hydrocarbon groups having 2 to 24 carbon atoms which contain heteroatoms (e.g., —$CH_2$—S—R", —$CH_2$—O—R" or —$CH_2$—C(O)OR", wherein R" is a hydrocarbon group having 1 to 18 carbon atoms). Further, although not explicitly shown in formula (i), it is also contemplated that the benzene ring may additionally be substituted with one or more of the above described Q groups. The residue of the organic compound to which group (i) is chemically bonded is not critical as long as it does not contain moieties which would interfere with the dynamic vulcanization, described infra. For example, this residue may be a hydrocarbon, a substituted hydrocarbon or a hetero atom-containing hydrocarbon group of the appropriate valence. It is also contemplated that the group according to formula (i) can be attached to hydrogen to form an organophenol. Preferably, the hindered phenol compound has a number average molecular weight of less than about 3,000.

A preferred hindered phenol compound contains at least one group of the formula

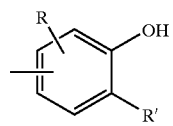

(ii)

in its molecule wherein the benzene ring may be optionally further substituted with hydrocarbon groups having 1 to 24 carbon atoms. In formula (ii), R is an alkyl group having one to four carbon atoms and R' is a hydrocarbon group having 4 to 8 carbon atoms.

Preferably, one to four of the groups shown in structures (i) or (ii) are attached to an organic residue of appropriate valence such that the contemplated compound has a molecular weight (MW) of less than about 1,500. Most preferably, four such groups are present in component (C) and this compound has a molecular weight of less than about 1,200. This monovalent (or polyvalent) organic residue can contain one or more heteroatoms such as oxygen, nitrogen, phosphorous and sulfur. The R' groups in the above formula may be illustrated by t-butyl, n-pentyl, butenyl, hexenyl, cyclopentyl, cyclohexyl and phenyl. It is preferred that both R and R' are t-butyl. For the purposes of the present invention, a group according to formula (ii) can also be attached to hydrogen to form a diorganophenol.

Non-limiting specific examples of suitable hindered phenols include 1,1,3-Tris(2'-methyl-4'-hydroxy-5'-t-butylphenyl)butane, N,N'-hexamethylene bis(3-(3,5-di-t-butyl-4-hydroxyphenyl)propionamide), 4,4'-thiobis(2-t-butyl-5-methylphenol), 1,3,5-tris(4-tert-butyl-3-hydroxy-2,6-dimethyl benzyl)-1,3,5-triazine-2,4,6-(1H,3H,5H)-trione, N,N'-hexamethylenebis(3,5-di-tert-butyl-4-hydroxyhydrocinnamamide), tetrakis(methylene(3,5-di-tert-butyl-4-hydroxy-hydrocinnamate))methane, 1,3,5-trimethyl-2,4,6-tris(3,5-di-tert-butyl-4-hydroxybenzyl) benzene, 4,4'-methylenebis(2,6-di-tertiary-butylphenol), 2,2'-thiobis(6-tert-butyl-4-methylphenol), 2,2'-thiobis(4-octylphenol), 4,4'-thiobis(6-tert-butyl-2-methylphenol), 4,4'-thiobis(3,6-di-sec-amylphenol), 2-(4,6-bis(2,4-dimethylphenyl)-1,3,5,-triazin-2-yl)-5-(octyloxy)phenol, 2,4-bisoctylmercapto-6-(3,5-di-tert-butyl-4-hydroxyanilino)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate, 1,3,5-tris(4-tert-butyl-3-hydroxy-2,6-dimethylbenzyl) isocyanurate, 2,6-di-tert-butyl-4-methoxyphenol, 2,5-di-tert-butylhydroquinone, 2,5-di-tert-amylhydroquinone, 2,6-di-tert-butylhydroquinone, 2,5-di-tert-butyl-4-hydroxyanisole, 2,6-diphenyl-4-octadecyloxyphenol, 3,5-di-tert-butyl-4-hydroxyanisole, 3,5-di-tert-butyl-4-hydroxyphenyl stearate, bis(3,5-di-tert-butyl-4- hydroxyphenyl)adipate, esters of beta-(3,5-di-tert-butyl-4-hydroxyphenyl)propionic acid with mono- or polyhydric alcohols (e.g., methanol, ethanol, n-octanol, trimethylhexanediol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, trimethylolpropane, tris(hydroxyethyl)isocyanurate, N,N'-bis(hydroxyethyl)oxalamide, 3-thiaundecanol, 3-thiapentadecanol, 4-hydroxymethyl-1-phospha-2,6,7-trioxabicyclo(2.2.2) octane and esters of beta-(5-tert-butyl-4-hydroxy-3-methylphenyl)propionic acid with mono- or polyhydric alcohols (as above).

Thioesters of the invention are compounds having at least one group of the formula

$$G-S-G \quad\quad (iii)$$

wherein

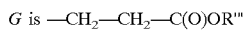
$$G \text{ is } -CH_2-CH_2-C(O)OR'''$$

and R''' is a monovalent hydrocarbon group having 1 to 24 carbon atoms. Specific non-limiting examples of suitable thioesters include distearyl 3,3'-thiodipropionate, dilauryl-3,3'-thiodipropionate and di(tridecyl)3,3'-thiodipropionate.

The hindered amine of the present invention is a low molecular weight organic compound or a polymer which contains at least one divalent group of the formula

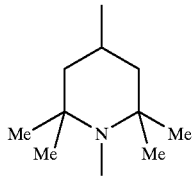
(iv)

wherein Me hereinafter denotes a methyl group. The backbone of this component is not critical as long as it does not contain functionality which would interfere with the dynamic vulcanization of the silicone gum and it may be illustrated by low-molecular and polymeric polyalkylpiperidines, as disclosed in U.S. Pat. No. 4,692,486, hereby incorporated by reference. Preferably, the above group has the structure

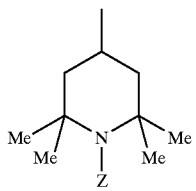
(v)

wherein Z is selected from hydrogen or an alkyl group having 1 to 24 carbon atoms, preferably hydrogen.

Specific non-limiting examples of suitable hindered amines include: 1,6-hexanediamine, N, N'-bis(2,2,6,6-pentamethyl-4-piperidinyl)-, polymers with morpholine-2,4,6-trichloro-1,3,5-triazine; 1,3-benzendicarboxamide, N,N'-bis(2,2,6,6-tetramethyl-4-piperidinyl), polymers with 2,4,-Dichloro-6-(4-morpholinyl)-1,3,5-triazine; bis(1,2,2,6,6-pentamethyl-4-piperidinyl)sebacate; bis(2,2,6,6-tetramethyl-4-piperidinyl)sebacate; dimethyl succinate polymer with 4-hydroxy-2,2,6,6-tetramethyl-1-piperidine ethanol; and polymethyl(propyl-3-oxy-(2',2',6',6'-tetramethyl-4'-piperidinyl)siloxane.

Preferred stabilizers of the invention are tetrakis (methylene(3,5-di-tert-butyl-4-hydroxy-hydrocinnamate)) methane, N,N'-hexamethylenebis(3,5-di-tert-butyl-4-hydroxyhydrocinnamamide) and 1,1,3-tris(2'-methyl-4'-hydroxy-5'-t-butylphenyl)butane, 1,3,5-tris(4-tert-butyl-3-hydroxy-2,6-dimethyl benzyl)-1,3,5-triazine-2,4,6-(1H,3H,5H)-trione, and dilauryl-3,3'-thiodipropionate.

Non-limiting specific examples of component (F) include various hindered phenols marketed by Ciba Specialty Chemicals Corporation under the trade name Irganox™:

Irganox™ 1076=octadecyl 3,5-di-tert-butyl-4-hydroxyhydrocinnamate,

Irganox™ 1035=thiodiethylene bis(3,5-di-tert-butyl-4-hydroxyhydrocinnamate),

Irganox™ MD 1024=1,2-bis(3,5-di-tert-butyl-4-hydroxyhydrocinnamoyl)hydrazine,

Irganox™ 1330=1,3,5-trimethyl-2,4,6-tris(3,5-di-tert-butyl-4-hydroxybenzyl)benzene, Irganox™ 1425 WL=calcium bis(monoethyl(3,5-di-tert-butyl-4-hydroxybenzyl)phosphonate) and Irganox™ 3114=1,3,5-tris-(3,5-di-tert-butyl-4-hydroxybenzyl)-1,3,5-triazine-2,4,6(1H,3H,5H)-trione.

Preferred hindered phenols are Irganox™ 245 {triethyleneglycol bis (3-(3'-tert-butyl-4'-hydroxy-5'-methylphenyl) propionate)}, Irganox™ 1098 {N,N'-hexamethylenebis(3,5-di-tert-butyl-4-hydroxyhydrocinnamamide)} and Irganox™ 1010 {tetrakis(methylene(3,5-di-tert-butyl-4-hydroxy-hydrocinnamate))methane}.

From 0.01 to 5 parts by weight of stabilizer (F) are preferably employed for each 100 parts by weight of polyamide (A) plus silicone base (B). Preferably 0.1 to 0.75 parts by weight, more preferably 0.475 to 0.525 parts by weight, of (F) are added for each 100 parts by weight of (A) plus (B).

In addition to the above-mentioned components, a minor amount of an optional additive (G) can be incorporated in the compositions of the present invention. Preferably, this optional component is added at a level of 0.5 to 40 weight percent based on the total composition, more preferably 0.5 to 20 weight percent. This optional additive can be illustrated by, but not limited to, reinforcing fillers for polyamide resins, such as glass fibers and carbon fibers; extending fillers, such as quartz, barium sulfate, calcium carbonate, and diatomaceous earth; pigments, such as iron oxide and titanium oxide; electrically conducting fillers, such as carbon black and finely divided metals; heat stabilizers, such as hydrated cerric oxide; antioxidants; flame retardants, such as halogenated hydrocarbons, alumina trihydrate, magnesium hydroxide and organophosphorous compounds; and other fire retardant (FR) materials. A preferred FR additive is calcium silicate particulate, preferably a wollastonite having an average particle size of 2 to 30 μm. Further, optional component (G) can be a plasticizers for the silicone gum component, such as polydimethylsiloxane oil, and/or a plasticizer for the polyamide component. Examples of the latter include phthalate esters such as dicyclohexyl phthalate, dimethyl phthalate, dioctyl phthalate, butyl benzyl phthalate and benzyl phthalate; trimellitate esters such as $C_1$–$C_9$ alkyl trimellitate; sulfonamides such as N-cyclohexyl-p-toluenesulfonamide, N-ethyl-o,p-toluenesulfonamide and o-toluenesulfonamide, and liquid oligomeric plasticizers. Preferred plasticizers are liquids of low volatility which minimize emissions of plasticizer at the common melt temperatures of polyamides.

The above additives are typically added to the final thermoplastic composition after dynamic cure, but they may also be added at any point in the preparation provided they do not interfere with the dynamic vulcanization mechanism. Of course, the above additional ingredients are only used at levels which do not significantly detract from the desired properties of the final composition.

According to the method of the present invention, the thermoplastic elastomer is prepared by thoroughly dispersing silicone base (B), compatibilizer (C), and stabilizer (F) in polyamide (A) and dynamically vulcanizing the diorganopolysiloxane in the base using organohydrido silicon compound (D) and catalyst (E). For the purposes of the present invention, the weight ratio of silicone base (B) to polyamide resin (A) is greater than 35:65. It has been found that when this ratio is 35:65 or less, the resulting vulcanizate generally has a modulus more resembling the polyamide resin than a thermoplastic elastomer. On the other hand, the above mentioned ratio should be no more than about 85:15 since the compositions tend to be weak and resemble cured silicone elastomers above this value. Notwithstanding this upper limit, the maximum ratio of (B) to (A) for any given combination of components is also limited by processability considerations since too high a silicone base content results in at least a partially crosslinked continuous phase which is no longer thermoplastic. For the purposes of the present invention, this practical limit is readily determined by routine experimentation and represents the highest level of component (B) which allows the TPSiV to be compression molded. It is, however, preferred that the final thermoplastic elastomer can also be readily processed in other conventional plastic operations, such as injection molding and extrusion and, in this case, the weight ratio of components (B) to (A) should be no more than about 75:25. Such a preferred thermoplastic elastomer which is subsequently re-processed often has a tensile strength and elongation which are within 10% of the corresponding values for the original TPSiV (i.e., the thermoplastic elastomer is little changed by re-processing). Although the amount of silicone base consistent with the above mentioned requirements depends upon the particular polyamide resin and other components selected, it is preferred that the weight ratio of components (B) to (A) is 40:60 to 75:25, more preferably 40:60 to 70:30.

Mixing is carried out in any device which is capable of uniformly dispersing the components in the polyamide resin, such as an internal mixer or a twin-screw extruder, the latter being preferred for commercial preparations. The temperature is preferably kept as low as practical consistent with good mixing so as not to degrade the resin. Depending upon the particular system, order of mixing is generally not critical and, for example, components (A), (C), (D) and, (F) can be added to (B) at a temperature above the softening point (i.e., melt point or glass temperature) of (A), catalyst (E) then being introduced to initiate dynamic vulcanization. However, components (B) through (F) should be well dispersed in resin (A) before dynamic vulcanization begins. As previously mentioned, it is also contemplated that the silicone base can be formed in-situ. For example, the reinforcing filler may be added to a mixer already containing the polyamide resin and diorganopolysiloxane gum at a temperature below the softening point of the resin to thoroughly disperse the filler in the gum. The temperature is then raised to melt the resin, the other ingredients are added and mixing/dynamic vulcanization are carried out. Optimum temperatures, mixing times and other conditions of the mixing operation depend upon the particular resin and other components under consideration and these may be determined by routine experimentation by those skilled in the art. It is, however, preferred to carry out the mixing and dynamic vulcanization under a dry, inert atmosphere (i.e., one that does not adversely react with the components or otherwise interfere with the hydrosilation cure), such as dry nitrogen, helium or argon.

As noted above, in order to be within the scope of the present invention, the tensile strength or elongation, or both, of the TPSiV elastomer must be at least 25% greater than that of a corresponding simple blend. A further requirement of the invention is that the TPSiV has at least 25% elongation, as determined by the test described infra. In this context, the term "simple blend" (or physical blend) denotes a composition wherein the weight proportions of resin (A), base (B) and compatibilizer (C) are identical to the proportions in the TPSiV, but no cure agents are employed (i.e., either component (D) or (E), or both, are omitted and the gum is therefore not cured). In order to determine if a particular composition meets the above criterion, the tensile strength of the TPSiV is measured on dumbbells having a length of 25.4 mm and a width of 3.2 mm and a typical thickness of 1 to 2 mm, according to ASTM method D 412, at an extension rate of 50 mm/min. At least three such samples are evaluated and the results averaged after removing obvious low readings due to sample inhomogeneity (e.g., such as voids, contamination or inclusions). These values are then compared to the corresponding average tensile and elongation values of a sample prepared from the simple blend composition. When at least a 25% improvement in tensile and/or elongation over the simple blend is not realized there is no benefit derived from the dynamic vulcanization and such TPSiVs are not within the scope of the present invention.

The thermoplastic elastomer prepared by the above described method can then be processed by conventional techniques, such as extrusion, vacuum forming, injection molding, blow molding, overmolding or compression molding. Moreover, these compositions can be reprocessed (recycled) with little or no degradation of mechanical properties.

The novel thermoplastic elastomers of the present invention can be used to fabricate wire and cable insulation; vibration and sound dampening components; electrical connectors; automotive and appliance components, such as belts, hoses, air ducts, boots, bellows, gaskets and fuel line components; furniture components; "soft-feel" grips for hand-held devices (e.g., handles for tools); architectural seals; bottle closures; medical devices; sporting goods; and general rubber parts.

EXAMPLES

The following examples are presented to further illustrate the compositions and method of this invention, but are not to be construed as limiting the invention, which is delineated in the appended claims. All parts and percentages in the examples are on a weight basis and all measurements were obtained at about 23° C., unless indicated to the contrary.

Materials

The following materials, listed alphabetically for ease of reference, were employed in the examples.

BASE 1 is a silicone rubber base made from 68.78% PDMS 1, defined infra, 25.8% of a fumed silica having a surface area of about 250 m²/g (Cab-O—Sil® MS-75 by Cabot Corp., Tuscola, Ill.), 5.4% of a hydroxy-terminated diorganopolysiloxane having an average degree of polymerization (DP) of about 8 and 0.02% of ammonium carbonate.

BASE 2 is a silicone rubber base made from 76.68% PDMS 1, defined infra, 17.6% of a fumed silica having a surface area of about 250 m²/g, 5.7% of a hydroxy-terminated diorganopolysiloxane having an average degree of polymerization (DP) of about 8 and 0.02% of ammonia.

BASE 3 is a silicone rubber base made from 53.68% PDMS 1, defined infra, 35.5% of a fumed silica having a surface area of about 250 m²/g, 10.8% of a hydroxy-terminated diorganopolysiloxane having an average degree of polymerization (DP) of about 8 and 0.02% of ammonia.

BASE 4 is a silicone rubber base made from 87.9% PDMS 1, defined infra, 10% of a fumed silica having a surface area of about 250 m²/g, 2.1% of a hydroxy-terminated diorganopolysiloxane having an average degree of polymerization (DP) of about 8.

CATALYST 1 is a 1.5% platinum complex of 1,3-diethenyl-1,1,3,3-tetramethyldisiloxane; 6% tetramethyldivinyldisiloxane; 92% dimethylvinyl ended polydimethylsiloxane and 0.5% dimethylcyclopolysiloxanes having 6 or greater dimethylsiloxane units.

COMPATIBILIZER 1 is an epoxy-functional polydimethylsiloxane described as an (epoxypropoxypropyl) methylsiloxane-dimethyl siloxane copolymer having a number average molecular weight of 5,700 and marketed under the trade name EXP-29 by Genesee Polymer Corp., Flint, Mich.

COMPATIBILIZER 2 is an (epoxypropoxypropyl) methylsiloxane-dimethyl siloxane copolymer having a number average molecular weight of 8,300 and marketed under the trade name EXP-32 by Genesee Polymer Corp.

COMPATIBILIZER 3 is an epoxy-ended silicone polymer described as an epoxypropoxypropyl-terminated polydimethylsiloxane having a number average molecular weight of 4,730 and marketed under the trade name GP-504 by Genesee Polymer Corp.

COMPATIBILIZER 4 is allyl glycidyl ether obtained from Aldrich Chemical Co., Milwaukee, Wis.

COMPATIBILIZER 5 is allyl succinic anhydride obtained from Polysciences, Inc., Warrington, Pa.

COMPATIBILIZER 6 is a succinic anhydride-terminated polydimethylsiloxane having a number average molecular weight of 600–800 and marketed under the trade name DMS-Z11 by Gelest, Tullytown, Pa.

COMPATIBILIZER 7 is an epoxypropoxypropyl-terminated polydimethylsiloxane having a number average molecular weight of 900–1,100 and marketed under the trade name DMS-E12 by Gelest.

COMPATIBILIZER 8 is an (epoxycyclohexylethyl) methylsiloxane-dimethyl siloxane copolymer having a number average molecular weight of 18,000 and marketed under the trade name EMS-232 by Gelest.

COMPATIBILIZER 9 is a siloxane-based polyamide prepared according to methods described in above cited U.S. Pat. No. 5,981,680 to Petroff et al. and having the formula

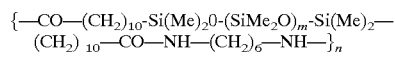

wherein m has an average value of 13 and n is such that the number average molecular weight of the copolymer is 14,950 by gel permeation chromatography (GPC) using polystyrene standard and tetrahydrofuran solvent.

COMPATIBILIZER 10 is similar to COMPATIBILIZER 9 wherein m has an average value of 28 and n is such that the number average molecular weight of the copolymer is 17,760 by GPC (as above).

COMPATIBILIZER 11 is similar to COMPATIBILIZER 9 wherein m has an average value of 43 and n is such that the number average molecular weight of the copolymer is 68,410 by GPC (as above).

COMPATIBILIZER 12 is an unsaturated diamide of the formula

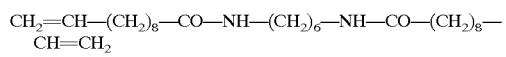

COMPATIBILIZER 13 is an aminopropyl-terminated polydimethylsiloxane having a degree of polymerization of 14.

COMPATIBILIZER 14 is an aminopropyl-terminated polydimethylsiloxane marketed by Gelest under the trade name DMS-A12.

COMPATIBILIZER 15 is an ethylene oxide-dimethylsiloxane-ethylene oxide block copolymer marketed by Gelest under the trade name DBE-C25.

CYANOX 1790 is a hindered phenol stabilizer marketed by Cytec Industries, West Paterson, N.J., and described as 1,3,5-tris(4-tert-butyl-3-hydroxy-2,6-dimethyl benzyl)-1,3,5-triazine-2,4,6-(1H,3H,5H)-trione.

CYANOX LTDP is a thioester stabilizer marketed by Cytec Industries, West Paterson, N.J., and described as dilauryl-3,3'-thiodipropionate.

IRGANOX™ 1010 is a hindered phenol stabilizer marketed by Ciba-Geigy and described as tetrakis { methylene(3, 5-di-tert-butyl-4-hydroxy-hydrocinnamate)} methane.

IRGANOX™ 1098 is a hindered phenol described as N,N'-hexamethylenebis(3,5-di-(tert)-butyl-4-hydroxyhydrocinnamamide) and marketed by Ciba-Geigy.

NYLON 12-A is nylon 12 obtained from Aldrich Chemical Co.; m.p.=178° C.

NYLON 12-B is Rilsan™ AMNO, a nylon 12 marketed by Elf Atochem NA, Inc., Philadelphia, Pa.; m.p.=175° C.

NYLON 6-A is a nylon 6 marketed under the trade name Zytel™ 7301 by Du Pont; m.p. 215–225° C.

NYLON 6-B is a nylon 6 marketed as CM 1017 by Toray Industries Inc., Japan; m.p.=223° C.

NYLON 6-C is a nylon 6 obtained from Aldrich Chemical Co.; m.p. 229° C.

NYLON 6/6 is a nylon 6/6 obtained from Aldrich Chemical Co.; m.p.=267° C.

NYLOSTAB S-EED is a hindered amine stabilizer marketed by Clariant GmbH, Augsburg, Germany) and described as 1,3-benzendicarboxamide, N, N'-bis(2,2,6,6-tetramethyl-4-piperidinyl).

LOWINOX CA22 is a hindered phenol stabilizer marketed by Great Lakes Chemical Corporation, Indianapolis, Ind., and described as 1,1,3-tris(2'-methyl-4'-hydroxy-5'-t-butylphenyl)butane.

PDMS 1 is a gum consisting of 99.81 wt % $Me_2SiO$ units, 0.16% MeViSiO units and 0.03% $Me_2ViSiO_{1/2}$ units. Prepared by potassium catalyzed equilibration of cyclic siloxanes wherein the catalyst is neutralized with carbon dioxide. This gum has plasticity of about 150.

X-LINKER 1 is an SiH-functional crosslinker consisting essentially of 68.4% MeHSiO units, 28.1% $Me_2SiO$ units and 3.5% $Me_3SiO_{1/2}$ units and has a viscosity of approximately 29 mpa·s. This corresponds to the average formula $MD_{16}D'_{39}M$, in which where M is $(CH_3)_3Si-O-$, D is $-Si(CH_3)_2-O-$ and D' is $-Si(H)(CH_3)-O-$.

Comparative Example A1

A masterbatch was prepared by adding 200 g of BASE 1 to a Haake System 9000™ bowl mixer (300 ml bowl) under a dry nitrogen atmosphere using roller rotors at 100° C. and 60 rpm (revolutions per minute). After 3 minutes, 1.5 g of X-LINKER 1 were slowly added to the mixer and the masterbatch was homogenized for 6 minutes.

NYLON 12-A (72 g; dried 4hrs at 80° C.) was added to the mixer at 190° C. and 60 rpm under a dry nitrogen purge. After three minutes, the above described masterbatch (108.7 g) was added and mixed for 4 minutes. Finally, CATALYST 1(0.78 g) was added and the process torque increased to a maximum of 6,000 m-g and then decreased, mixing being stopped when the torque reached 5,500 m-g.

A sample of the above material was compression molded at 225° C. for 5 minutes under approximately 10 ton pressure (99 KPa) in a stainless steel Endura™ 310-2 coated mold followed by cold pressing for 3 minutes. The tensile properties were measured on dumbbells having a length of 25.4 mm, width of 3.18 mm and a thickness of 1 to 2 mm, according to ASTM method D 412 and at an extension rate of 50 mm/min. At least 3 samples were tested, the results averaged, the results being presented in Table A1

Example A2

Dried (4hrs/80° C.) NYLON 12-A ($7^2$ g) was added to the mixer, as in Comp. Ex. A1. After three minutes, COMPATIBILIZER 1 (2 g) was added dropwise to the melt. After another 4 minutes, a masterbatch as described in Comp. Ex. A1(108.7 g) was added and mixed for an additional 4 minutes. Finally, CATALYST 1 (0.78 g) was added dropwise and the torque increased to a maximum of 7,200 m-g and then decreased. The run was stopped when the torque reached 6,500 m-g. The resulting TPSiV was again compression molded and tested, the results being shown in Table A1.

TABLE A1

| Example | Compatibilizer (g) | Tensile (MPa) | Elongation (%) | Final Torque (m-g) |
|---|---|---|---|---|
| Comp. Ex. A1 | 0 | 7.3 | 37 | 5,500 |
| Ex. A2 | COMPATIBILIZER 1 EXP-29 (2 g) | 13.6 | 178 | 6,500 |

It can be seen from Table A1 that the TPSiV which contained a compatibilizer had improved mechanical properties while preserving a relatively low process torque. Previous experiments under similar conditions indicated that such high levels of mechanical properties could only be obtained by employing greater amounts of SiH-functional crosslinker when no compatibilizer was included. However, these formulations required much higher process torque (e.g., 18,000 to>20,000 m-g).

Comparative Example A3

Dried (4hrs/80° C.) NYLON 12-A (72 g) was added to the mixer at 190° C., as in Comp. Ex. A1. After three minutes, IRGANOX™ 1010 (0.2 g) was added. Then BASE 1 (108 g) was added and mixed for 4 minutes, whereupon the torque increased to 1,800 m-g. X-LINKER 1 (3.9 g) was added and mixed for 5 minutes. Finally, CATALYST 1 (0.88 g) was added and the torque increased immediately, the run being stopped at a torque of 12,000 m-g. Properties of the resulting TPSiV were determined as described above and are reported in Table A2.

Example A4

Dried (4hrs/80° C.) NYLON 12-A (72 g) was added to the mixer, as in Comp. Ex. A3. After three minutes, COMPATIBLIZER 4 (0.32 g) was added to the melted nylon and mixing was continued for another 4 minutes. IRGANOX™ 1010 (0.2 g ) was added and, after 2 minutes, BASE 1 (108 g) was mixed in for 4 minutes. The torque increased to 1,800 m-g and CROSSLINKER 1 (3.9 g) was added and mixed for 5 minutes. Finally, CATALYST 1 (0.88 g) was added and the torque increased immediately, the run being stopped when the torque reached 12,000 m-g. Properties of the resulting TPSiV were determined as described above and are reported in Table A2.

Example A5

A TPSiV was prepared according to the methods of Example A4 wherein 0.4 g of COMPATIBILIZER 5 was used instead of 0.32 g of COMPATIBILIZER 4. Properties of the resulting TPSiV were determined as described above and are reported in Table A2.

Comparative Example A6

Dried NYLON 12-A (72 g) was added to the mixer as in (Comparative) Example A3. After three minutes, IRGANOX™ 1010 (0.2 g) was added to the mixture. Then 108 g of BASE 1 was added and mixed for 4 minutes and the torque stabilized at 1,800 m-g. X-LINKER 1 (1.75 g) was added and mixed for 5 minutes and then CATALYST 1 (0.39 g) was added. The torque increased to a maximum value of 14,000 m-g within 6 minutes and the run was stopped when the torque leveled off at 10,000 m-g. Properties of the resulting TPSiV were determined as described above and are reported in Table A2.

Example A7

A TPSiV was prepared according to the method of (Comparative) Example A6 wherein 0.4 g of COMPATIBILIZER 5 was added three minutes after the nylon was melted. Properties of the resulting TPSiV were determined as described above and are reported in Table A2.

Comparative Example A8

Dried NYLON 12-A (72 g) was added to the mixer as in (Comparative) Example A3. After three minutes, 0.2 g of IRGANOX™ 1010 and 108 g of BASE 1 were added and mixed for 4 minutes. The torque stabilized at 1,800 m-g, whereupon X-LINKER 1 (3.5 g) was added and mixed for 5 minutes. Finally, CATALYST 1 (0.78 g) was added. The torque increased immediately and the run was stopped at a torque of 18,000 m-g. Properties of the resulting TPSiV were determined as described above and are reported in Table A2.

Examples A9–A11

TPSiVs were prepared as in (Comparative) Example A8 wherein 2 g of COMPATIBILIZER 3,2 g of COMPATIBILIZER 1 and 0.4 g of COMPATIBILIZER 5, respectively, were added 3 minutes after the nylon was melted. Each run was stopped at the torque indicated in the last column of Table A2, this table also showing the resulting properties of the compositions.

TABLE A2

| Example | Compatibilizer Type/amount (g) | Tensile (MPa) | Elongation (%) | Torque (m-g) |
|---|---|---|---|---|
| (Comp.) Ex. A3 | none | 10.8 | 100 | >12,000 |
| Ex. A4 | COMPATIBILIZER 4 (0.32 g) | 13.0 | 172 | >12,000 |
| Ex. A5 | COMPATIBILIZER 5 (0.4 g) | 13.7 | 160 | >12,000 |
| (Comp.) Ex. A6 | none | 9.2 | 63 | 10,000* |
| Ex. A7 | COMPATIBILIZER 5 (0.4 g) | 8.2 | 118 | 10,000* |
| (Comp.) Ex. A8 | none | 14.5 | 185 | >18,000 |
| Ex. A9 | COMPATIBTLIZER 3 (2 g) | 16.1 | 211 | >18,000 |
| Ex. A10 | COMPATIBILIZER 1 (2 g) | 17.4 | 229 | >18,000 |
| Ex. A11 | COMPATIBILIZER 5 (0.4 g) | 17.6 | 255 | >18,000 |

*maximum torque observed.

From Table A2 it can be seen that nylon-based TPSiVs which contained a compatibilizer of the invention showed significantly improved mechanical properties relative to systems which did not include a compatibilizer.

Examples A12–A23

The bowl of a Haake RheoMix™ 3000 mixer (roller rotors; 245° C.; 60 rpm; under dry nitrogen purge) was charged with 120 g of BASE 1. After 2 minutes, 80 g of NYLON 6-B (dried at 80° C./4 hr) was added and the combination mixed for 2 minutes. COPATIBILIZER 6 (0.8 g) was added and, after 2 more minutes, 1.5 g of IRGANOX™ 1098 were added and was allowed to mix for 2 additional, whereupon 3.88 g of X-LINKER 1 were added. After 4 more minutes, 0.88 g of CATALYST 1 was added dropwise as mixing was continued. Once the cure was complete, the product was removed, compression molded at 250° C. for 5 minutes and tested, as described above.

The results are presented in Table A3 (Example A23).

The above procedure was followed using the compatibilizers (and amounts thereof) shown in the third column of Table A3, the amounts of IRGANOX™ 1098 shown in the fourth column of Table A3 and the nylon 6 resin indicated in the second column of Table A3. In the case of Examples A21–A24, each compatibilizer was first mixed with NYLON 6-A using a twin-screw extruder at a process temperature of 260–270° C. to form a compatibilized polyamide, according to the procedure described in Example C1, infra. Each compatibilized polyamide was then used as the resin portion in these formulations, the order of addition being the same as described above. Each composition was molded at 250° C. and tested, as described above, the results being shown in Table A3.

TABLE A3

| Example | NYLON | Compatibilizer Weight (g)/ Type | IRGANOX ™ 1098 content (g) | Tensile (MPa) | Elongation (%) | Torque (m-g) |
|---|---|---|---|---|---|---|
| (Comp.) Ex. A12 | 6-A | 0 | 0 | 9.5 | 29 | 4,000 |
| (Comp.) Ex. A13 | 6-A | 0 | 1.5 | 9.3 | 31 | 6,000 |
| A14 | 6-A | 0.8/COM. 6 | 0 | 16.0 | 104 | 6,000 |
| A15 | 6-A | 0.8/COM. 6 | 1.5 | 16.0 | 154 | 9,000 |
| A16 | 6-A | 1.6/COMP. 7 | 1.5 | 14.8 | 121 | 8,300 |
| A17 | 6-A | 0.8/COMP. 7 | 1.5 | 11.5 | 66 | 8,200 |
| A18 | 6-A | 0.8/COMP. 1 | 1.5 | 11.3 | 73 | 7,800 |
| A19 | 6-A | 1.6/COMP. 1 | 1.5 | 10.6 | 72 | 8,000 |
| (Comp.) Ex. A20 | 6-B | 0 | 0 | 9.0 | 33 | 4,000 |
| (Comp.) Ex. A21 | 6-B | 0 | 1.5 | 9.7 | 49 | 4,600 |
| A22 | 6-B | 0.8/COMP. 6 | 0 | 12.3 | 53 | 5,200 |
| A23 | 6-B | 0.8/COMP. 6 | 1.5 | 16.2 | 151 | 6,500 |

Examples A24–A29

Compatibilized polyamides formed from NYLON 12-B and the compatibilizers (and weight percentage thereof) shown in the second column of Table A4 were prepared in a twin-screw extruder at 220° C., as described in Example C1, infra. Eighty grams of each compatibilized resin was mixed with the following components and dynamically vulcanized (nitrogen purge; 220° C.; 60 rpm):

| | |
|---|---|
| BASE 1 | 120 g |
| IRGANOX ™ 1010 | 1.0 g |
| X-LINKER 1 | 1.94 g |
| CATALYST 1 | 0.8 g |

These compositions were molded and tested as described above and the results are shown in Table A4.

TABLE A4

| Example | Amount and Type of Compatibilizer in Resin | Tensile Strength (MPa) | Elongation (%) | Terminal torque (m-g) |
|---|---|---|---|---|
| (Comp.) Ex. A24 | 0% | 13.5 | 187 | 4900 |
| A25 | 1.0% COMPATIBILIZER 8 | 13.3 | 195 | 4300 |
| (Comp.) Ex. A26 | 0.5% COMPATIBILIZER 7 | 13.4 | 199 | 4300 |
| A27 | 1.0% COMPATIBILIZER 7 | 15.0 | 260 | 5400 |
| (Comp.) Ex. A28 | 2.0% COMPATIBILIZER 7 | 13.7 | 198 | 5500 |
| A29 | 1.0% COMPATIBILIZER 6 | 14.8 | 239 | 4000 |

The above results illustrate that the incorporation of a compatibilizer resulted in improved Tensile or elongation or reduced processing torque. They also illustrate the observation that each compatibilizer has an optimal concentration range, the latter being readily determined by routine experimentation (e.g., Example A27 for the case of COMPATIBILIZER 7).

Examples A30–A31

The procedures of Examples A24–A29 were repeated wherein the IRGANOX™ 1010 was omitted. In this case, a formulation which did not include a compatibilizer exhibited a torque of 4,300 m-g and the resulting TPSiV had a tensile of 7.6 MPa and elongation of 44%. Another formulation based on a compatibilized polyamide which contained 1% of COMPATIBILIZER 7 exhibited a torque of 5,000 m-g and the resulting TPSiV had a tensile of 8.0 MPa and elongation of 58%.

Examples A32–A34

NYLON 12-B (80 g) was added to a Haake System 900™ bowl mixer equipped with roller rotors at 21° C. and 60 rpm under nitrogen purge. After three minutes, base 1 (120 g) was added and mixed for 3 more minutes. IRGANOX™ 1010 (0.5 g) was added and mixed for 2 more minutes. X-LINKER 1 (1.9 g) was then added, followed by the addition of 2 g of COMPATIBLIZER 15. After mixing for another 3 minutes, CATALYST 1 (0.85 g) was added dropwise and the run was stopped when torque stabilized. The mechanical properties of the resulting TPSiV are summarized in Table A5 (Example A34).

The above procedures were repeated wherein COMPATIBILIZER 14 was substituted for COMPATIBILIZER 15 (Example A33) and wherein no compatibilizer was used (Comparative Example A32). These compositions were molded and tested as described above and the results are again shown in Table A5.

TABLE A5

| Samples Name | Compatibilizer | Tensile Strength (MPa) | Elongation (%) | Terminal Torque, (m-g) |
|---|---|---|---|---|
| (Comp.) Ex. A32 | None | 13.4 | 174 | 6500 |
| A33 | COMPATIBILIZER 14 | 14.2 | 201 | 10500 |
| A34 | COMPATIBILIZER 15 | 13.2 | 191 | 5000 |

It is again seen that at least elongation or tensile are improved or torque is reduced when compatibilizer is included.

Examples B1–B7

NYLON 12-A (80 g) was first dried for 2 hours at 120° C. and mixed at 210° C./60 rpm under a nitrogen atmosphere using roller rotors, as described above. IRGANOX™ 1010 (1.05 g) was mixed in for approximately 3 minutes, followed by 120 g of BASE 1 and, after approximately 3.5 more minutes, 3.07 g of COMPATIBILIZER 9, the latter being mixed for an additional 3.5 minutes. X-LINKER 1 (3.84 g) was added and the recorded mixing torque was approximately 1,800 m-g. After 4 minutes of mixing, 4.28 g (286 drops) of a mixture of one part of CATALYST 1 and 4 parts of a polydimethylsiloxane oil having a viscosity of about 1,000 mPa-s were added in three steps which were 3 to 5 minutes apart. The torque increased to and then leveled off at 8,800 m-g. Total mixing time from the addition of catalyst to completion of mixing was approximately 38 minutes. Mechanical evaluation of the resulting TPSiV is recorded in Table B 1 (Example B 1).

The above procedure was repeated using 3 grams of the compatibilizer shown in the second column of Table B 1. This table also shows results for a composition which did not include a compatibilizer (Comparative Example B7).

TABLE B1

| Example | Compatibilizer | Tensile (MPa) | Elongation (%) | Torque (m-g) |
|---|---|---|---|---|
| Ex. B1 | COMPATIBILIZER 9 | 16.7 | 265 | 8,700 |
| Ex. B2* | COMPATIBILIZER 9 | 16.0 | 254 | 14,500 |
| Ex. B3* | COMPATIBILIZER 10 | 16.2 | 241 | >19,000 |
| Ex. B4* | COMPATIBILIZER 11 | 15.8 | 256 | 11,000 |
| Ex. B5** | COMPATIBILIZER 12 | 18.4 | 277 | >20,000 |
| Ex. B6** | COMPATIBILIZER 12 | 16.7 | 257 | >20,000 |
| (Comp.) Ex. B7* | 0 | 14.9 | 200 | 15,000 |

*CATALYST 1 was not diluted and added in one step.
**diluted CATALYST 1 added in one step.

Examples B8–B9

A TPSiV (Comparative Example B8) was prepared according to Example B1 at 245° C. using a one-step catalyst addition and using the following ingredients:

| | |
|---|---|
| NYLON 6-C | 80 g |
| IRGANOX ™ 1010 | 1 g |
| BASE 1 | 120 g |
| X-LINKER 1 | 3.87 g |
| CATALYST 1 | 0.855 g |

A similar composition was prepared which also included 1.1 g of COMPATIBLIZER 13 (Example B9). These materials were molded at 255° C. and tested as described above, the properties being reported in Table B2.

TABLE B2

| Example | Compatibilizer Amount (g) | Tensile (MPa) | Elongation (%) | Final Torque (m-g) |
|---|---|---|---|---|
| (Comp.) Ex. B8 | 0 | 11.0 | 99 | 5,200 |
| Example B9 | 1.1 | 14.6 | 122 | 6,000 |

Example B10–B11

BASE 1 (120 g) was introduce into the Haake Rheocord™ 9000 bowl mixer (285° C./60 rpm) and 1.6 grams COMPATIBILIZER 7 were added, followed by 80 g of NYLON 6/6 (dried at 80° C./4 hours) with no waiting in between additions. This combination was mixed for 6 minutes, and 3.8 grams of X-LINKER 1 was added and allowed to mix for 2.0 minutes (8.0 minutes total). At this point, 0.86 gram of CATALYST 1 was introduced and torque increased from 3,000 m-g to 6,000 m-g. Mixing was stopped after a total time of 15.0 minutes, at which point torque had reached its maximum (6,000 m-g) and the final temperature was approximately 275° C. The resulting TPSiV elastomer was transferred to a pan of tap water to prevent further oxidation.

The above thermoplastic elastomer was dried (80° C./4 hours) to remove residual moisture from the quenching procedure, samples were molded at 265° C. and tested, as described above. Tensile strength was 11.2 MPa and elongation was 40%.

The above procedures were repeated wherein the compatibilizer was omitted. Tensile strength was 7.1 MPa and elongation was 9%.

Example C1

NYLON 12-B pellets (dried at 120° C. for 4 hours in a dessicating oven) were fed to an 18 mm Leistritz™ twin screw extruder fitted with a single-hole strand die and powered by a Haake™ 9000 torque rheometer drive via a feed throat using an AccuRate™ pellet feeder (feed rate= 49.0 g/min.). All temperature control zones on the extruder were set to 220° C. and the screw speed was set to 200 rpm. COMPATIBILIZER 2 was injected into the extruder via a MasterFlex™ CL peristaltic pump at a rate of 1.0 g/min. such that the final content of COMPATIBILIZER 2 in the resulting compatibilized polyamide was 2%. The extruded compatibilized polyamide was passed through a water bath at 5° C. and then pelletized in a Conair Jetro™ pelletizer model 304 (compatibilized polyamide 1). A TPSiV was then prepared on a Haake Rheomix™ 3000 mixer fitted with roller rotors (free volume=310 cm$^3$; 210° C.; 60 rpm) using a dry nitrogen purge at a flow rate of 236 cm$^3$/s. The above compatibilized polyamide 1 (93.9 g) was mixed and 1.0 g of IRGANOX™ 1010 was added at 1.1 minutes into the run. BASE 1 (99.4 g) was introduced (1.7 min.), followed by 3.2 g of X-LINKER 1 (4.9 min.). Mixing was continued and CATALYST 1 (0.752 g) was added (6.8 min.) to dynamically cure the silicone gum. The set temperature was reduced to 200° C. and, when the mixing torque reached a steady state value of 3,286 m-g, the resulting TPSiV was removed. The TPSiV was compression molded at 225° C. for 5 minutes and tested as described above. The average (5 measurements) tensile strength was 17.6 MPa and average elongation was 249%.

Example C2

The procedures of Example C1 were duplicated wherein COMPATIBILIZER 3 was substituted for COMPATIBILIZER 2 to provide a compatibilized polyamide in which the COMPATIBILIZER 3 content was 2% (compatibilized polyamide 2). The latter was used to prepare a TPSiV as in Example C1 wherein the final mixing torque was 3,860 m-g and total mixing time was 20.0 min. The resulting TPSiV was molded and tested, as described above, and exhibited a tensile strength of 17.8 MPa and an elongation of 252%.

Comparative Example C3

The procedures of Example C1 were duplicated wherein no compatibilizer was employed. Thus, 93.9 g of only dried NYLON 12-B was used to prepare a TPSiV, as previously described. Final torque was 8,210 m-g, this being more than double that observed in Examples C1 or C2. The resulting TPSiV was molded and tested, as described above, and exhibited a tensile strength of 17.4 MPa and an elongation of 221%.

It is seen from Examples C1 to C3 that inclusion of a compatibilizer according to the present invention improves elongation to some extent but greatly reduces the mixing torque (melt viscosity) of the final TPSiV.

Examples D1–D4

TPSiVs were prepared according to the methods described in Example A4 (mixing temperature=220° C.) using the following components (mixed in the order listed):

| | |
|---|---|
| NYLON 12-B | 80 g |
| COMPATIBILIZER 2 | 2.4 g |
| IRGANOX ™ 1010 | 1 g |
| BASE (as indicated in Table D1) | 120 g |
| X-LINKER 1 | 1.9 g |
| CATALYST 1 | 0.86 g |

The compositions were molded and tested, as described above, and the results are presented in Table D1.

TABLE D1

| Example | Silicone | Tensile (MPa) | Elongation (%) | Maximum Torque (m-g) |
|---|---|---|---|---|
| Example D1 | BASE 3 | 13.7 | 170 | 6,000 |
| Example D2 | BASE 1 | 13.5 | 194 | 6,000 |
| Example D3 | BASE 2 | 10.5 | 132 | 6,400 |
| Example D4 | BASE 4 | 5.2 | 47 | 2,500* |

*Total mix and vulcanization time = 75 minutes, this being about 3 times longer than other samples.

Examples D5–D10

TPSiVs were prepared according to the methods described in Example A4 (mixing temperature=220° C.) using the following components (mixed in the order listed):

| | |
|---|---|
| NYLON 12-B | 80 g |
| COMPATIBILIZER 2 | X (amount shown in second column of Table D2) |
| IRGANOX ™ 1010 | 1 g |
| BASE 1 | 120 g |
| X-LINKER 1 | Y (amount shown in third column of Table D2) |
| CATALYST 1 | 0.86 g |

These compositions were molded and tested as described above, the results being shown in Table D2.

TABLE D2

| Example | X (g) | Y (g) | Tensile (MPa) | Elongation (%) | Maximum Torque (m-g) |
|---|---|---|---|---|---|
| (Comp.) Ex. D5 | 0 | 1 | 8.0 | 81 | 4,600 |
| D6 | 0.8 | 1 | 9.3 | 105 | 4,300 |
| D7 | 2.4 | 1 | 9.9 | 130 | 4,600 |
| D8 | 1.2 | 1.9 | 10.7 | 124 | 7,000 |
| D9 | 2.4 | 1.9 | 13.7 | 170 | 6,000 |
| D10 | 3.6 | 1.9 | 11.1 | 138 | 7,800 |

Examples D11–D12

TPSiVs were prepared according to the methods described in Example A4 (mixing temperature=220° C.) using the following components (mixed in the order listed):

| | |
|---|---|
| NYLON 12-B | 80 g |
| COMPATIBILIZER 2 | 0.8 g |
| IRGANOX ™ 1010 | X (amount shown in second column of Table D3) |
| BASE 1 | 120 g |
| X-LINKER 1 | 1.9 g |
| CATALYST 1 | 0.95 g |

These compositions were molded and tested as described above, the results being shown in Table D3.

TABLE D3

| Example | X (g) | Tensile (MPa) | Elongation (%) | Maximum Torque (m-g) |
|---|---|---|---|---|
| Example D11 | 0 | 7.4 | 47 | 6,000 |
| Example D12 | 1 | 11.4 | 130 | 7,000 |

From Table D3 it is again seen that the addition of the hindered phenol improves mechanical properties.

Example E1 Comparative Example

BASE 1 (120.03 g) was added to a Haake Polylab #1 with roller rotors, at a set temperature of 240° C. with cooling throughout, rotor speed of 60 rpm and a nitrogen purge. At 0.5 minutes, 80.0 g of dried (4 hrs/80° C.) Nylon 6-D was added to the mixer and allowed to melt and mix for an additional 2 minutes. At 2.5 minutes, 3.812 g of X-LINKER 1 was added to the bowl and mixing continued for an additional 3 minutes and then the sample was pulled from the mixer. The sample was initially pressed for 3–10 minutes in a Carver Bench Press under 5 ton pressure (49.5 KPa) at room temperature. The above material was then compression molded at 250° C. for 3 minutes under 12 ton pressure with a two minute pre-heat, followed by a two minute cold pressing. The tensile properties of the material were measured on dumbbells having a bridge length of 33 mm, width of 0.1250 inches (0.3175 cm) and a typical thickness of 1.5 to 2 mm, following ASTM method D412 at an extensional pulling rate of 50 mm/min. The tensile attained was 2.8 MPa with an elongation of 7.9%.

Three specimens were also heat aged at 150° C. for 168 hours in accordance with ASTM D573, but the samples were degraded to a point where they could not be tested.

Fuel Immersion testing was done at 23° C. for 166 hours, following ASTM D471-98, with resulting tensile of 2.1 MPa (21% loss) and 15.2% elongation (92.4% gain)

Example E2 Comparative Example

BASE 1 (119.99 g) was added to a Haake Polylab #1 with roller rotors, at a set temperature of 240° C. with cooling throughout, rotor speed of 60 rpm and a nitrogen purge. At 0.3 minutes, 80.0 g of dried (4 hrs/8°° C.) Nylon 6-D was added to the mixer and allowed to melt and mix for an additional 1.5 minutes. At 2.5 minutes, 4.182 g of X-LINKER 1 was added to the bowl and mixing continued for an additional 2 minutes and then the sample was pulled from the mixer. At 4 minutes 2.32 g of a 1:4 (wt. %) mixture of CATALYST 1/1000 cst Dow Corning 200® Fluid was added to the mixture. The torque then increased from 1000 mg to 3500 mg in an 11-minute period. The mixer was then stopped and the sample was pulled from the mixer. The sample was evaluated using the procedure described in E1. The tensile attained was 11.0 MPa with an elongation of 31.7%.

Three specimens were also heat aged at 150° C. for 168 hours in accordance with ASTM D573, with resulting mechanicals of 6.067 MPa (39.9 loss) and 2.72% elongation (91.4% loss).

Fuel Immersion testing was done at 23° C. for 166 hours, following ASTM D471-98, with a resulting tensile of 11.4 MPa (3.6% gain) and 22.7% elongation (28.4% loss)

Example E3

BASE 1 (119.97 g) was added to a Haake Polylab #1 with roller rotors, at a set temperature of 240° C. with cooling throughout, rotor speed of 60 rpm and a nitrogen purge. At 0.8 minutes, 79.98 g of dried (4 hrs/80° C.) Nylon 6-D and 1.0 g of Cyanox 1790 was added to the mixer and allowed to melt and mix for an additional 2.0 minutes. At 2.5 minutes, 3.986 g of X-LINKER 1 was added to the bowl. At 4.8 minutes 2.73 g of a 1:4 (wt. %) mixture of CATALYST 1/1000cst Dow Coming 200® Fluid was added to the mixture. The torque then increased from 1000 mg to 5800 mg in an 1-minute period. The mixer was then stopped and the sample was pulled from the mixer. The sample was evaluated using the procedure described above. The tensile attained was 13.5 mPa with an elongation of 88.2%. Three specimens were also heat aged at 150° C. for 168 hours in accordance with ASTM D573, with resulting mechanicals of 11.36 MPa (15.8% loss) and 37.02% elongation (58% loss). Fuel Immersion testing was done at 23° C. for 166 hours, following ASTM D471-98, with a resulting tensile of 11.2 MPa (17.0% gain) and 42.7% elongation (51.6% loss)

Example E4

BASE 1 (210.4 g) was added to a Haake Polylab #1 with roller blades, at a set temperature of 20° C. with cooling throughout, rotor speed of 60 rpm and a nitrogen purge. At 0.9 minutes, 140.0 g of dried (4 hrs/80° C.) Nylon 6-D and 1.75 g of Cyanox 1790 was added to the mixer and allowed to melt and mix for an additional 5.0 minutes. At this time the mixture was taken from the bowl. The Sigma Blades were replaced with roller rotors and the temperature was set at 240° C. Then 201.0 g of the "cold premix" was added to the Haake and allowed to melt and mix. At 3.5 minutes, 3.810 g of X-LINKER 1 was added to the bowl. At 5.4 minutes 2.31 g of a 1:4 (wt. %) mixture of CATALYST 1/1000cst Dow Corning 200® Fluid was added to the mixture. The torque then increased from 1000 mg to 5200 mg in a 5 minute period. The mixer was then stopped and the sample was pulled from the mixer. The sample was evaluated using the procedure described in E1. The tensile attained was 14.6 MPa with an elongation of 80.1%.

Three specimens were also heat aged at 150° C. for 168 hours in accordance with ASTM D573, with resulting mechanicals of 14.7 MPa (.7% gain) and 62.4% elongation (22.1% loss). Fuel Immersion testing was done at 23° C. for 166 hours, following ASTM D471-98, with resulting tensiles of 12.4 MPa (15.1% loss) and 54.6% elongation (31.8% loss) Example E5

BASE 1 (119.99 g) was added to a Haake Polylab #1 with roller rotors, at a set temperature of 240° C. with cooling throughout, rotor speed of 60 rpm and a nitrogen purge. At 0.7 minutes, 80.0 g of dried (4 hrs/80° C.) Nylon 6-D and 1.0 g of Lowinox CA22 was added to the mixer and allowed to melt and mix for an additional 1.5 minutes. At 3.0 minutes, 3.831 g of X-LINKER 1 was added to the bowl. At 4.3 minutes 2.30 g of a 1:4 (wt. %) mixture of CATALYST 1/1000cst Dow Corning 200® Fluid was added to the mixture. The torque then increased from 1000 mg to 3500 mg in an 11-minute period. The mixer was then stopped and the sample was pulled from the mixer. The sample was evaluated using the procedure described in E1. The tensile attained was 15.62 MPa with an elongation of 86.4%.

Three specimens were also heat aged at 150° C. for 168 hours in accordance with ASTM D573, with resulting mechanicals of 16.6 MPa (6.3% gain) and 91.7% elongation (29.2% loss). Fuel Immersion testing was done at 23° C. for 166 hours, following ASTM D471-98, with resulting tensiles of 15.9 MPa (1.8% gain) and 86.4% elongation (28.5% loss).

Example E6

BASE 1 (210.4 g) was added to a Haake Polylab #1 with roller blades, at a set temperature of 20° C. with cooling throughout, rotor speed of 60 rpm and a nitrogen purge. At 0.6 minutes, 139.98 g of dried (4 hrs/80° C.) Nylon 6-D and 1.75 g of Lowinox CA22 was added to the mixer and allowed to melt and mix for an additional 5.0 minutes. At this time the mixture was taken from the bowl. The Sigma Blades were replaced with roller rotors and the temperature was set at 240° C. Then 201.5 g of the "cold premix" was added to the Haake and allowed to melt and mix. At 3.3 minutes, 3.797 g of X-LINKER 1 was added to the bowl. At 4.5 minutes 2.30 g of a 1:4 (wt. %) mixture of CATALYST 1/1000cst Dow Corning 200® Fluid was added to the mixture. The torque then increased from 1000 mg to 4000 mg in a 5 minute period. The mixer was then stopped and the sample was pulled from the mixer. The sample was evaluated using the procedure described in E1. The tensile attained was 15.0 MPa with an elongation of 113%.

Three specimens were also heat aged at 150° C. for 168 hours in accordance with ASTM D573, with resulting mechanicals of 15.5 MPa (3.3 gain) and 72.8% elongation (35.5% loss). Fuel Immersion testing was done at 23° C. for 166 hours, following ASTM D471-98, with resulting tensiles of 14.3 MPa (4.7% loss) and 78.5% elongation (31.7% loss).

Example E7

BASE 1 (119.98 g) was added to a Haake Polylab #1 with roller rotors, at a set temperature of 240° C. with cooling throughout, rotor speed of 60 rpm and a nitrogen purge. At 0.7 minutes, 80.0 g of dried (4 hrs/8°° C.) Nylon 6-D and 1.0 g of Cyanox LTDP was added to the mixer and allowed to melt and mix for an additional 2.0 minutes. At 3.0 minutes, 3.87 g of X-LINKER 1 was added to the bowl. At 4.8 minutes 2.29 g of a 1:4 (wt. %) mixture of CATALYST 1/1000 cst Dow Coming 200® Fluid was added to the mixture. The torque then increased from 1000 mg to 4900 mg in an 12-minute period. The mixer was then stopped and the sample was pulled from the mixer. The sample was evaluated using the procedure described in E1. The tensile attained was 14.5 MPa with an elongation of 91.8%.

Three specimens were also heat aged at 150° C. for 168 hours in accordance with ASTM D573, with resulting mechanicals of 5.8 MPa (57.9% loss) and 2.9% elongation (96.8% loss). Fuel Immersion testing was done at 23° C. for 166 hours, following ASTM D471-98, with resulting tensiles of 11.4 MPa (21.4% gain) and 42.2% elongation (54.0% loss)

Example F1

A Haake 9000 Mixing Bowl was charged with BASE 1 at 285° C. After two minutes, NYLON 6/6 (80.24 g) was added and allowed to thoroughly melt for 2.7 minutes, at which point COMPATIBILIZER 7 (1.39 g) was added. At 6.7 minutes of total mixing time, 1.02 g of LOWINOX CA22 was added to the bowl. After two more minutes (8.7 minutes total), X-LINKER 1 (4.02 g) was added, and allowed to incorporate for 2.4 minutes. The CATALYST 1 (57 drops) was then added. Crosslinking then took place, lasting about 3 minutes, resulting in a maximum torque of about 6,500 m-g and a total mixing time of 17 minutes. The material was transferred directly from the bowl of the mixer to a pan of cold water to minimize oxidation. The material was then dried for 4 hours at 80° C. After drying, it was then tested as described above. The results are summarized in Table F1

Example F2

A Haake 9000 Bowl mixer at 285° C. was charged with BASE 1 (120.12 g), COMPATIBILZER 7 (1.51 g), NYLON 6/6 (80.37 g), and NYLOSTAB SEED (1.0 g). These components were then allowed to mix for 7 minutes at 280° C., thus allowing a thorough melt of the nylon. At this point, 3.76 g of X-LINKER 1 were added and allowed to blend in for 2 minutes. At 9 minutes total mix time, 57 drops of CATALYST 1 were added to begin the crosslinking process. The crosslinking took 6 minutes, resulting in a maximum torque of approximately 7,550 m-g. The material was then transferred directly into a pan of cold water to prevent any further oxidation. It was then dried for 4 hours at 80° C. and tested as described above. The results are summarized in Table F1

TABLE F1

| Example | Compatibilizer (g) | Stabilizer (g) | Tensile (MPa) | Elongation (%) | Final Torque (m-g) |
|---|---|---|---|---|---|
| F1 | Compatiblizer 7 (1.39 g) | Lowinox CA22 (1.0 g) | 16.2 | 114.5 | 6,500 |
| F2 | Compatiblizer 7 (1.51 g) | Nylostab S-EED (1.0 g) | 15.1 | 131 | 7,550 |

That which is claimed is:

1. A method for preparing a thermoplastic elastomer, said method comprising:
   (I) mixing
   (A) a rheologically stable polyamide resin having a melting point or glass transition temperature of 25° C. to 275° C.,
   (B) a silicone base comprising
      (B') 100 parts by weight of a diorganopolysiloxane gum having a plasticity of at least 30 and having an average of at least 2 alkenyl groups in its molecule and
      (B") 5 to 200 parts by weight of a reinforcing filler, the weight ratio of said silicone base to said polyamide resin is from 35:65 to 85:15,
   (C) for each 100 parts by weight of said polyamide resin, a compatibilizer selected from
      (i) from 0.1 to 5 parts by weight of a coupling agent having a molecular weight of less than 800 which contains at least two groups independently selected from ethylenically unsaturated group, epoxy, anhydride, silanol, carboxyl, hydroxyl, alkoxy, having 1 to 20 carbon atoms or oxazoline in its molecule,
      (ii) from 0.1 to 10 parts by weight of a functional diorganopolysiloxane having at least one group selected from epoxy, anhydride, silanol, carboxyl, amine, alkoxy having 1 to 20 carbon atoms or oxazoline in its molecule, or
      (iii) from 0.1 to 10 parts by weight of a copolymer comprising at least one diorganopolysiloxane block and at least one block selected from polyamide, polyether, polyurethane, polyurea, polycarbonate or polyacrylate,
   (D) an organohydrido silicon compound which contains an average of at least 2 silicon-bonded hydrogen groups in its molecule and
   (E) a hydrosilation catalyst, components (D) and (E) being present in an amount sufficient to cure said diorganopolysiloxane (B'),
   (F) a stabilizer selected from hindered phenols, thioesters, hindered amines, 2,2'-(1,4-phenylene)bis(4H-3, 1-benzoxazin-4-one), and 3,5-di-tert-butyl-4-hydroxybenzoic acid, hexadecyl ester; and
   (II) dynamically curing said diorganopolysiloxane (B').

2. The method according to claim 1, wherein the weight ratio of said silicone base (B) to said polyamide resin (A) is from 35:65 to 75:25.

3. The method according to claim 2, wherein said polyamide is selected from the group consisting of nylon 6, nylon 6/6, nylon 6/12 and nylon 12.

4. The method according to claim 2, wherein said diorganopolysiloxane (B') is a gum selected from the group consisting of a copolymer consisting essentially of dimethylsiloxane units and methylvinylsiloxane units and a copolymer consisting essentially of dimethylsiloxane units and methylhexenylsiloxane units and said reinforcing filler (B") is a fumed silica.

5. The method according to claim 4, wherein said organohydrido silicon component (D) is selected from the group consisting of a polymer consisting essentially of methylhydridosiloxane units and a copolymer consisting essentially of dimethylsiloxane units and methylhydridosiloxane units, having 0.5 to 1.7 weight percent hydrogen bonded to silicon and having a viscosity of 2 to 500 mPa-s at 25° C. and said catalyst (E) is a neutralized complex of platinous chloride and divinyltetramethyldisiloxane.

6. The method according to claim 3, wherein the weight ratio of said silicone base (B) to said polyamide resin (A) is 40:60 to 70:30.

7. The method according to claim 1 wherein 0.01 to 5 parts by weight of the stabilizer (F) per 100 parts by weight of said polyamide plus said silicone base is included in mixing step (I).

8. The method according to claim 1, wherein said stabilizer is a hindered phenol having at least one group of the formula

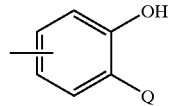

in its molecule, in which Q is a monovalent organic group having 1 to 24 carbon atoms selected from
   (i) hydrocarbon groups,
   (ii) hydrocarbon groups which optionally contain heteroatoms selected from sulfur, nitrogen or oxygen or
   (iii) halogen-substituted versions of (i) or (ii),
wherein the benzene ring of said formula may additionally be substituted with at least one Q group.

9. The method according to claim 8, wherein said stabilizer is a hindered phenol having at least one group of the formula

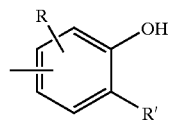

in its molecule, wherein R is an alkyl group having one to four carbon atoms, R' is a hydrocarbon group having 4 to 8 carbon atoms and wherein the benzene ring of said formula may be optionally further substituted with a hydrocarbon group having 1 to 24 carbon atoms.

10. The method according to claim 1, wherein said hindered phenol is selected from tetrakis(methylene(3,5-di-tert-butyl-4-hydroxy-hydrocinnamate))methane, N,N'-hexamethylenebis(3,5-di-tert-butyl-4-hydroxy-hydrocinnamamide) and 1,1,3-tris(2'-methyl-4'-hydroxy-5'- t-butylphenyl)butane, 1,3,5-tris(4-tert-butyl-3-hydroxy-2,6-dimethyl benzyl)-1,3,5-triazine-2,4,6-(1H,3H,5H)-trione, and dilauryl-3,3'-thiodipropionate.

11. The method according to claim 1, wherein said compatibilizer is selected from allyl glycidyl ether, allyl succinic anhydride,

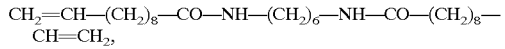

epoxy-functional polydimethylsiloxanes, amine-functional polydimethylsiloxanes succinic anhydride-functional polydimethylsiloxanes, polyamide-polydimethylsiloxane copolymers or poly(alkylene oxide)-polydimethylsiloxane copolymers.

12. The method according to claim 7, wherein said compatibilizer is selected from allyl glycidyl ether, allyl succinic anhydride,

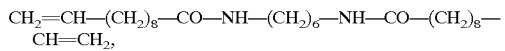

epoxy-functional polydimethylsiloxanes, amine-functional polydimethylsiloxanes succinic anhydride-functional polydimethylsiloxanes, polyamide-polydimethylsiloxane copolymers or poly(alkylene oxide)-polydimethylsiloxane copolymers.

13. The method according to claim 1, wherein a fire retardant is included in mixing step (I).

14. A thermoplastic elastomer prepared by the method of claim 1.

15. A thermoplastic elastomer prepared by the method of claim 2.

16. A thermoplastic elastomer prepared by the method of claim 3.

17. A thermoplastic elastomer prepared by the method of claim 4.

18. A thermoplastic elastomer prepared by the method of claim 5.

19. A thermoplastic elastomer prepared by the method of claim 6.

20. A thermoplastic elastomer prepared by the method of claim 7.

21. A thermoplastic elastomer prepared by the method of claim 8.

22. A thermoplastic elastomer prepared by the method of claim 9.

23. A thermoplastic elastomer prepared by the method of claim 10.

24. A thermoplastic elastomer prepared by the method of claim 11.

25. A thermoplastic elastomer prepared by the method of claim 12.

* * * * *